United States Patent
Morgan et al.

(10) Patent No.: US 6,226,054 B1
(45) Date of Patent: May 1, 2001

(54) GLOBAL LIGHT BOOST FOR PULSE WIDTH MODULATION DISPLAY SYSTEMS

(75) Inventors: Daniel J. Morgan, Denton; Gregory J. Hewlett, Garland; Peter F. VanKessel, Allen, all of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/088,644

(22) Filed: Jun. 2, 1998

Related U.S. Application Data
(60) Provisional application No. 60/048,586, filed on Jun. 4, 1997.

(51) Int. Cl.$^7$ .................................................. G02F 1/00
(52) U.S. Cl. ........................... 348/759; 348/148; 348/771; 358/160; 345/85; 345/154
(58) Field of Search .................................... 348/759, 148, 348/771; 358/160; 345/85, 154

(56) References Cited

U.S. PATENT DOCUMENTS

| | | | |
|---|---|---|---|
| 4,429,304 | 1/1984 | Fujita | 340/765 |
| 5,619,228 * | 4/1997 | Doherty | 345/148 |
| 5,657,036 * | 8/1997 | Markandey et al. | 345/85 |
| 5,751,379 * | 5/1998 | Markandey et al. | 348/759 |

FOREIGN PATENT DOCUMENTS

| | | |
|---|---|---|
| 641 926 A3 | 3/1984 | (CH) . |
| 0 193 728 B1 | 9/1986 | (EP) . |
| 0 261 901 | 3/1988 | (EP) . |

* cited by examiner

Primary Examiner—Andrew I. Faile
Assistant Examiner—Sam Huang
(74) Attorney, Agent, or Firm—Wade James Brady III; Frederick J. Telecky, Jr.

(57) ABSTRACT

A method for performing pulse width modulation (PWM) on a binary spatial light modulator using spatial-temporal multiplexing. A 10% light boost is achieved by eliminating deadtimes that are typically generated using the global-reset operation of a DMD when bit-planes having small on times are utilized. The number of bit-planes required is reduced by using a combination of binary and ternary bit-planes to achieve grayscale of a displayed digital image. By using a combination of spatial and temporal processing, digital pixel values can be displayed using a reduced number of bit-planes, without generating perceived artifacts such as pulsing due to pixels being turned on-off from frame to frame.

20 Claims, 5 Drawing Sheets

GLOBAL LIGHT BOOST FOR PULSE WIDTH MODULATION DISPLAY SYSTEMS

CROSS REFERENCE TO RELATED APPLICATIONS

This application claims priority under 35 U.S.C. §119(c)(1) of provisional application Ser. No. 60/048,586, filed on Jun. 4, 1997. Cross reference is made to the following co-pending patent applications, each being assigned to the same assignee as the present invention and the teachings included herein by reference:

| SERIAL NUMBER | TITLE | FILING DATE |
| --- | --- | --- |
| 08/725,719 | Method to Reduce Perceptual Contouring in Display System | 10-04-96 |
| 09/008674 | Boundary Dispersion for Mitigating PWM Temporal Contouring Artifacts in Digital Displays | 6-02-98 |

FIELD OF THE INVENTION

The present invention relates generally to digital video display systems, and more particularly to digital display systems utilizing bit-planes for performing pulse width modulation to display digital video data.

BACKGROUND OF THE INVENTION

Binary spatial light modulators are typically comprised of an array of elements each having two states, on and off. The use of pulse width modulation (PWM) is one conventional approach of digitally displaying incoming analog video data, as compared to an analog display such as a cathode ray tube (CRT) based system. PWM typically comprises dividing a frame of incoming video data into weighted segments. For example, for a system that samples the luminance component of incoming video data in 8-bit samples, the video frame time is divided up into 255 time segments or pixel values ($2^8-1$). Conventionally, the 8-bit samples are formatted with binary values. The most significant bit (MSB) data is displayed on a given element for 128 time segments. In the present example, the next MSB has a time period of 64 time segments, and so on, such that the next bits have weights of 32, 16, 8, 4, 2 and 1 time segments, consecutively. Thus, the least significant bit (LSB) has only one time segment. All pixel values are comprised of a summation of these weighted bits.

In DMD display systems, such as disclosed in commonly assigned U.S. Pat. No. 5,278,652 entitled "DMD Architecture and Timing for Use in a Pulse-Width Modulated Display System", the teachings of which are incorporated herein by reference, light intensity for each pixel is typically displayed as a linear function of the pixel digital codes. For an 8-bit binary code, 0 is no light, 255 is peak light, and 128 is midscale light. Codes between 0 and 255 form a grayscale in each color. This grayscale sets the image resolution for the system by defining the number of discrete levels of light that can be produced for each color; i.e. red, green and blue.

Pulse width modulation (PWM) schemes for controlling the mirrors conventionally modulate the mirrors with time periods being powers of two. For example, 20 us, 40 us, 80 us, 160 us, 320 us, 640 us, 1280 us, and 2,560 us are used to define the mirror on-times for the 8 bit-planes needed for 8-bit video where 5.5 ms is available per color of light being modulated.

Light is transmitted to the image plane, such as a display screen, as black for the bit-plane of a pixel which is logic 0 or at full brightness during a bit-plane which equals logic 1. Since the on-times for bit-planes vary, this results in PWM over a frame period. The viewer's eyes integrate the on-times of modulated light so that gray levels are perceived.

A typical DMD has a memory cell under each mirror that contains the bit-plane of data to be applied to that mirror. In every video frame, each bit-plane of data is first loaded into the memory cells of the DMD, one bit-plane at a time, and then the bit-plane data in the memory cells under the mirrors are globally applied to all associated mirrors at the same time. This global application of data to all mirrors at the same time is called "global-reset" operation of a DMD. A DMD loaded and operated in a global-reset mode requires that all DMD memory cells be loaded before data is globally applied to the mirrors. In the case of bit-planes representing LSBs with short on-times, data is successfully applied to the mirrors and displayed, but then all the mirrors are reset to the off-state prior to a new bit-plane being completely loaded into the memory cells of the DMD. This is because a new bit-plane load can not completely take place in the background while displaying the short bit on-times. All memory cells must be cleared (via a high speed parallel clear of all memory cells) prior to the end of the short bit on-times. The clearing of the entire memory is needed so that all mirrors can be turned off globally to terminate the short on-times. However, the mirrors can not be turned back on until the DMD is fully loaded with a new bit-plane of data. This results in "deadtime" after displaying any LSB bit-planes with on-times less than the DMD bit-plane data load time.

Figure 1:
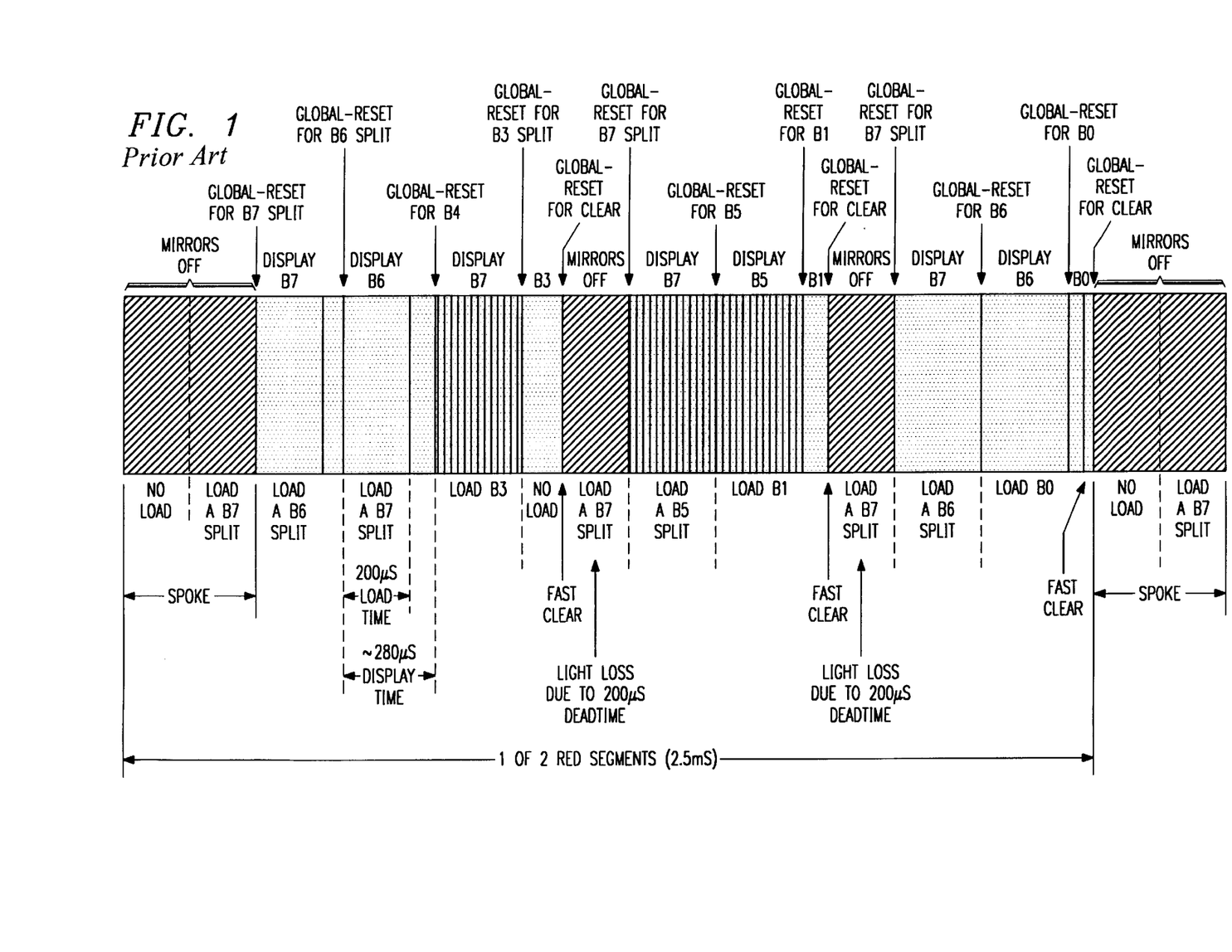
FIG. 1 is a graphic illustration of a conventional loading and display sequence of bit-planes when the load-times of bit planes, i.e. B3 and B1, exceeds the associated display times and creates light loss due to deadtime.

FIG. 1 shows an example of light loss due to deadtimes after the lower weighted bit-planes are displayed. For example, consider bit-plane B3. B3 has an on-time of 160 us, but the DMD load time is 200 us, and thus another bit-plane can not be loaded in the background while bit plane B3 is being displayed. Thus, the DMD will have all mirrors off for 200 us after each 160 us on-time for bit-plane B3 to load a split B7 bit-plane, creating the deadtime and consequently a significant light loss.

Thus, any time a bit-plane on-time is less than the DMD load time, i.e. B0, B1, B2 and B3, a 200 us deadtime will result after that bit-plane is displayed on the DMD, -where only two deadtimes can be hidden behind spokes of the colorwheel in one DMD system. This results in lost light on the display screen since all mirrors are turned off during this deadtime.

The following is an example of the total light loss for an 8-bit color sequential DMD system, using a 6 segment color wheel with 2 segments each of red, green and blue (RGB);

| Bit | Deadtime (per color) |
| --- | --- |
| B7 | 0 |
| B6 | 0 |
| B5 | 0 |
| B4 | 0 |
| B3 | 200 us |
| B2 | 0 (200 us hidden behind spoke 1) |
| B1 | 200 us |
| B0 | 0 (200 us hidden behind spoke 2) |

For a 6-segment RGB color wheel, 3× (200 us×2)=1200 us of deadtime exists during each 16.67 ms video frame. (The two other deadtimes, for bit-plane B0 and B2 for each color will be hidden in the color wheel spokes, thus, no light is lost due to these bits due to short load times). When including spoke losses, the effective video frame is typically 12.33 ms. The equation for determining the total lost light is then:

100−((12.33 ms−1.2 ms)×100)/12.33 ms=~10% light loss

There is a need to provide a means to regain this lost light while using the global-reset approach. The present invention seeks to eliminate all the deadtimes not hidden by spokes, and increase lumens to the display screen. The present invention also sets forth to reduce the number of bit-planes required for displaying the digital video data, without sacrificing the total number of grayshades per color.

SUMMARY OF THE INVENTION

The present invention achieves technical advantages as a method of displaying digital video data using pulse width modulation by using spatial-temporal multiplexing of two bit-planes. One bit-plane is eliminated, and two other bit-planes are re-weighted to maintain, for instance, 8-bits of resolution per color while using only 7 bit-planes. One deadtime is eliminated since one of the lower-weighted bit-planes is eliminated, and another deadtime is eliminated because another shorter bit-plane weight is increased sufficiently that no DMD memory clear function is needed to show the short bit on-time.

In a first preferred embodiment, the lowest weighted bit-plane B0 is eliminated, and the bit-plane B2 is increased and reweighted from 4 to 6. In a second preferred embodiment, the second lowest weighted bit-plane B1 is eliminated, and the bit-plane B3 is reweighted from 8 to 12. In both preferred approaches, digital logic is applied to two of the processing bits for each pixel prior to formatting the incoming video data into the displayed bit-planes. Spatial-temporal multiplexing is performed on the two bits to achieve grayscales of the incoming video data. Each of these two bits are ternary. A two-frame spatial-temporal pattern, such as a checkerboard, is used on these bits to avoid spatial and temporal contouring and to form the grayshades. For a given source pixel value to be displayed, depending on the value, spatial-temporal multiplexing is performed using two bits over two consecutive video frames. For instance, according to the first preferred embodiment of the present invention where the B0 bit-plane is eliminated and the bit-plane B2 is reweighted from 4 to 6, a pixel value of 4 is perceived by displaying a pixel value 6 for one frame, and a pixel value of 2 the next frame, thus providing an average pixel value of 4 over the two consecutive frames. The least significant pixel value of 1 is displayed by displaying the pixel value 2 for one frame, and 0 for the next frame, thus providing an average pixel value of 1 for that pixel over two frames.

According to the second preferred embodiment of the present invention, the bit-plane B1 is eliminated, and the bit-plane B3 is reweighted from 8 to 12. A pixel value of 2 is displayed by displaying a pixel value of 4 for one frame, and a pixel value of 0 for the next frame, to achieve an average pixel value of 2 over the two frames. Likewise, a pixel value of 6 is perceived by displaying a pixel value at 12 for one frame, and a pixel value of 0 for the next frame. Likewise, a pixel value of 8 is perceived by displaying a pixel value of 12 for the first frame, and a pixel value of 4 for the second frame, realizing an average pixel value of 8 over the two bit frames. All 256 grayshades are achieved through combinations of these 7 bit-planes for a 8-bit resolution system, using the spatial-temporal multiplexing when necessary.

DESCRIPTION OF THE PREFERRED EMBODIMENT

Referring now to Table 1, there is shown conventional loading and display of normal bit weight bit-planes on a DMD to achieve pulse width modulation (PWM) on incoming analog video data. The MSB bit-plane B7 has a bit weight of 128 time segments, although it is divided or split into 8 segments, and a LSB bit-plane B0 that has a bit weight of 1 time segment. All bit-planes are binary, that is, based on $2^n$.

TABLE 1

| NORMAL BIT WEIGHT |
|---|
| 128 |
| 64 |
| 32 |
| 16 |
| 8 |
| 4 |
| 2 |
| 1 |
| Normal Grayscale Sequence: 1, 2, 2 + 1, 4, 4 + 1, 4 + 2, 4 + 2 + 1, 8, 8 + 1, etc. |

Referring now to Table 2A, there is shown a first preferred embodiment of the present invention whereby the first bit-plane B0 is eliminated, and the third bit-plane B2 is reweighted from 4 to 6.

TABLE 2A

GLOBAL BOOST BIT WEIGHT

128
64
32
16
8
6
2
No Bit

Global Boost Grayscale Sequence: 2/2, 2, 6/2, 2/2 + 6/2, 6/2 + 2, 6,
6 + 2/2, 8, 8 + 2/2, 8 + 2, 8 + 6/2,
8 + 2/2 + 6/2, 8 + 6/2 + 2,
8 + 6, 8 + 6 + 2/2, 16 . . .
128 + 64 + 32 + 16 + 8 + 6/2 +
2/2 + 2 + 2/2

For 8-bit resolution, only 7 bit-planes are required. Spatial-temporal multiplexing is performed on bits B1 and B2 to achieve all 256 pixel values, thus bits B1 and B2 are ternary rather than binary. The global boost grayscale sequence is shown in Table 2A whereby, for instance, a digital pixel value of 1 for a particular pixel is achieved by turning on (logic 1) the bit-plane B1 for one frame, and turning off the bit B1 (logic 0) the next frame (2/2), thus providing the average pixel value of 1 for that pixel over two consecutive video frames. For instance, a pixel value of 3 is achieved using the reweighted ternary bit B2 by displaying a pixel value of 6 for one frame, and a pixel value of 0 for the next frame, represented as 6/2, to achieve an average pixel value of 3 for that pixel over the two consecutive video frames. There is no spatial-temporal multiplexing on the other binary bits, thus, a pixel value of 8, for instance, is achieved by displaying a value of 8 both frames, regardless of the spatial location of the pixel. All 256 pixel values are displayed using combinations of the binary and ternary bits, as illustrated.

Figure 2:
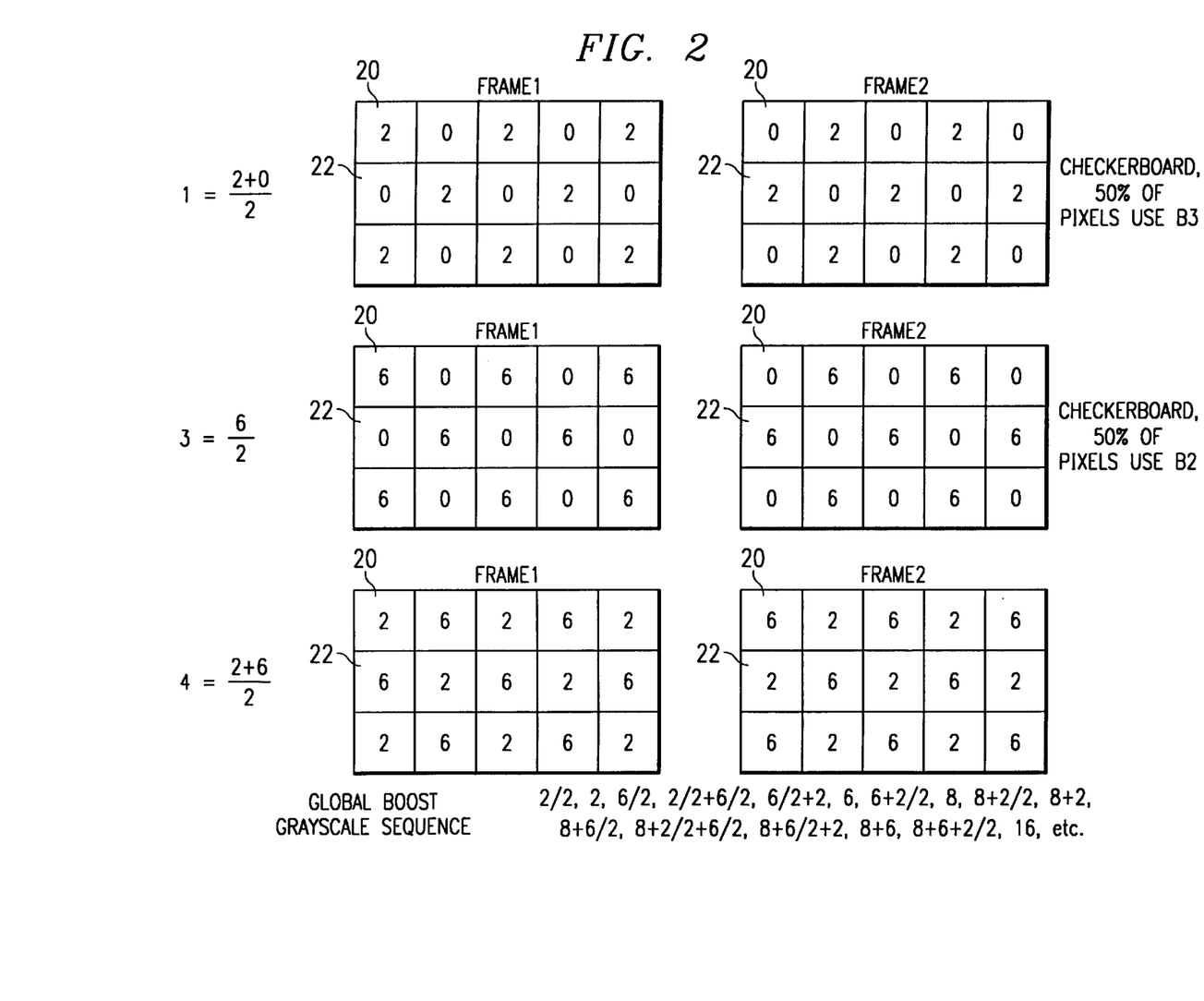
FIG. 2 is an illustration of a first preferred embodiment of the present invention whereby the bit-plane B0 is eliminated, and the bit-plane B2 is reweighted to a value of 6, whereby some of the pixel values or grayshades are achieved using spatial-temporal multiplexing across two frames of displayed video data.

Referring to FIG. 2, the spatial-temporal multiplexing approach of the present invention is graphically illustrated. A checkerboard pattern is utilized for each frame when the temporal approach of using ternary bits is undertaken to spatially take into account each particular pixel. Other patterns could be utilized in place of the checkerboard if desired. According to the first preferred approach shown in Table 2A, since the bit-plane B0 has been eliminated, a pixel value of 1 is achieved for a pixel by using the ternary bits B1. This is done by either displaying a pixel value of 2 for the first frame and a pixel value of 0 for the following second frame, or displaying a pixel value of 0 during frame 1 and a pixel value of 2 during frame 2. This approach provides an average pixel value of 1 over two consecutive video frames. The checkerboard approach takes into account the spatial relationship of the different pixels. By using this checkerboard approach, wherein a group of pixels are on one frame and off the next, the pulsing of the larger pixel values is not visually noticeable by the observer, especially when a large group of adjacent pixels have the same value, which is common in graphics.

Likewise, to display a pixel value of 3, a digital value of 6 is displayed using ternary bit B2 for one frame and displaying a pixel value of 0 for the same pixel the next frame, or displaying a 0 the first frame and a 6 the next frame, depending on the spatial orientation of the pixel as shown in FIG. 2. This temporal approach is further appreciated by understanding how a pixel value of 4 is displayed. Depending on a spatial location of the pixel, either a pixel value of 2 or 6 is displayed one frame, with the other pixel value being displayed the next frame to achieve an average pixel value of 4 over the two consecutive video frames. This pixel value of 4 is perceived by the viewer since light is integrated by the human eye. In effect, bit B1 and bit B2 have ternary values, with the other 5 bits having binary values. The other bits are binary because, for instance, if a 2 value is to be displayed, the same value of 2 is displayed for that pixel each frame, and no averaging over time is performed, regardless of the spatial location of the pixel.

Figure 3:
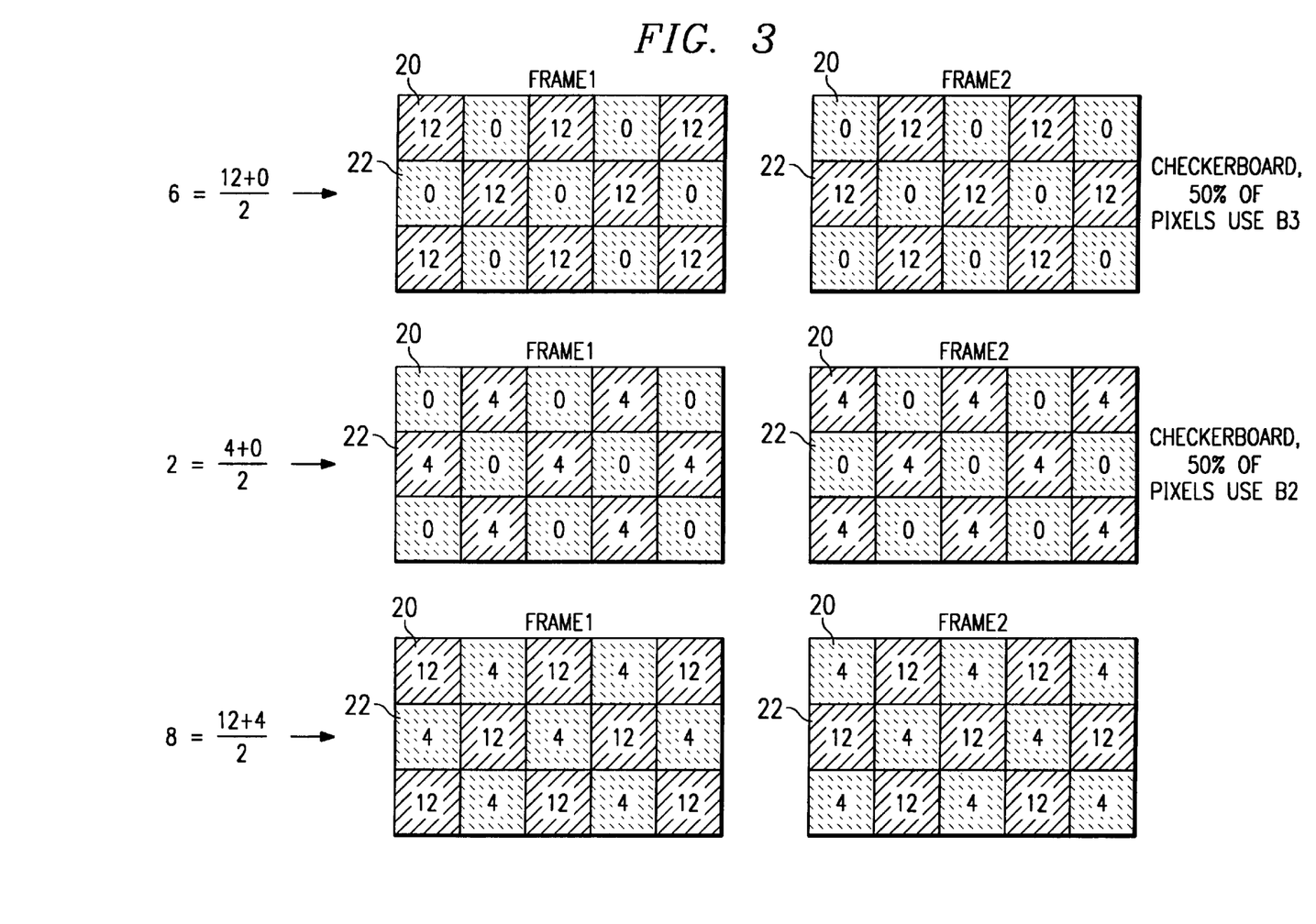
FIG. 3 is an alternative preferred embodiment of the present invention, similar to that of FIG. 2, whereby the bit-plane B1 is eliminated, and the bit-plane B3 is reweighted from 8 to 12, with some bit-values being achieved using spatial-temporal multiplexing over two consecutive displayed video frames.

Referring now to FIG. 3, there is shown an alternative preferred embodiment of the present invention corresponding to the global boost bit weight shown in Table 2B.

TABLE 2B

GLOBAL BOOST BIT WEIGHT

128
64
32
16
12
4
no bit
1

Global Boost Grayscale Sequence: 1, 4/2, 4/2 + 1, 4, 4 + 1, 12/2,
12/2 + 1, 12/2 + 4/2, 12/2 + 4/2 + 1,
12/2 + 4, 12/2 + 4 + 1, 12, 12 + 1,
12 + 4/2, 12 + 4/2 + 1, 16 . . .
128 + 64 + 32 + 16 + 12/2 +
4/2 + 4 + 4/2 + 1

The bit-plane B1 is eliminated, and ternary bit-plane B3 is reweighted and increased from 8 to 12. A bit-plane with a 12 weight won't generate a deadtime, which is described further with reference to FIG. 5. Here, it can be seen that a digital pixel value of 6 is achieved by displaying a value of 12 using ternary bit B3 for the first frame, and a value of 0 for the second frame, or alternatively, a value of 0 the first frame, and a value of 12 the second frame. The human eye perceives a pixel value of 6 over the two video frames due to the integration of light by the human eye. Likewise, a digital pixel value of 2 is achieved using ternary bit B2 by providing a value of 0 the first frame and a value of 4 the second frame, or alternatively, displaying a value of 4 the first frame and 0 the second frame for that particular pixel. Again, the checkerboard approach is utilized to minimize any perceived "pulsing" of pixel values between one value and the next, frame to frame, for large blocks of adjacent pixels having the same pixel value.

Importantly, when multiple ternary bits are simultaneously displayed to achieve a particular grayshade, the spatial phase for the checkerboard patterns can affect image artifacts. It is best to disperse the light energy per unit area, produced as a result of the checkerboards, as evenly as possible over the relevant display area on the screen. For example, displaying the value of "8" for multiple adjacent pixels, as shown in FIG. 3, illustrates this point. In any given frame adjacent pixels have the values of "12" and "4" because the checkerboard patterns for the 2 bits are always spatially out of phase. If they were not out of phase, adjacent pixels would have the values "16" and "0". Since in this case the light energy would be less evenly distributed over the display screen, the system would be more susceptible to generating image artifacts.

Still referring to FIG. 3, there is seen that the digital pixel value of 8 is achieved by using ternary bit B3 to display a value of 12 frame one and the other ternary bit B2 to display a value 4 the next frame for the same pixel, or alternatively, displaying a value of 4 the first frame using bit B2, and a value of 12 the second frame using bit B3. Again, the average pixel value of 8 is perceived by the viewer due to integration of light by the human eye. The specific global boost grayscale sequence is shown for pixel values 1–16 to illustrate the combination of using binary and ternary bit-planes, with it being understood that this pattern repeats to achieve the other pixel values 17–255 using combinations of the binary and ternary bits as shown.

Figure 4:
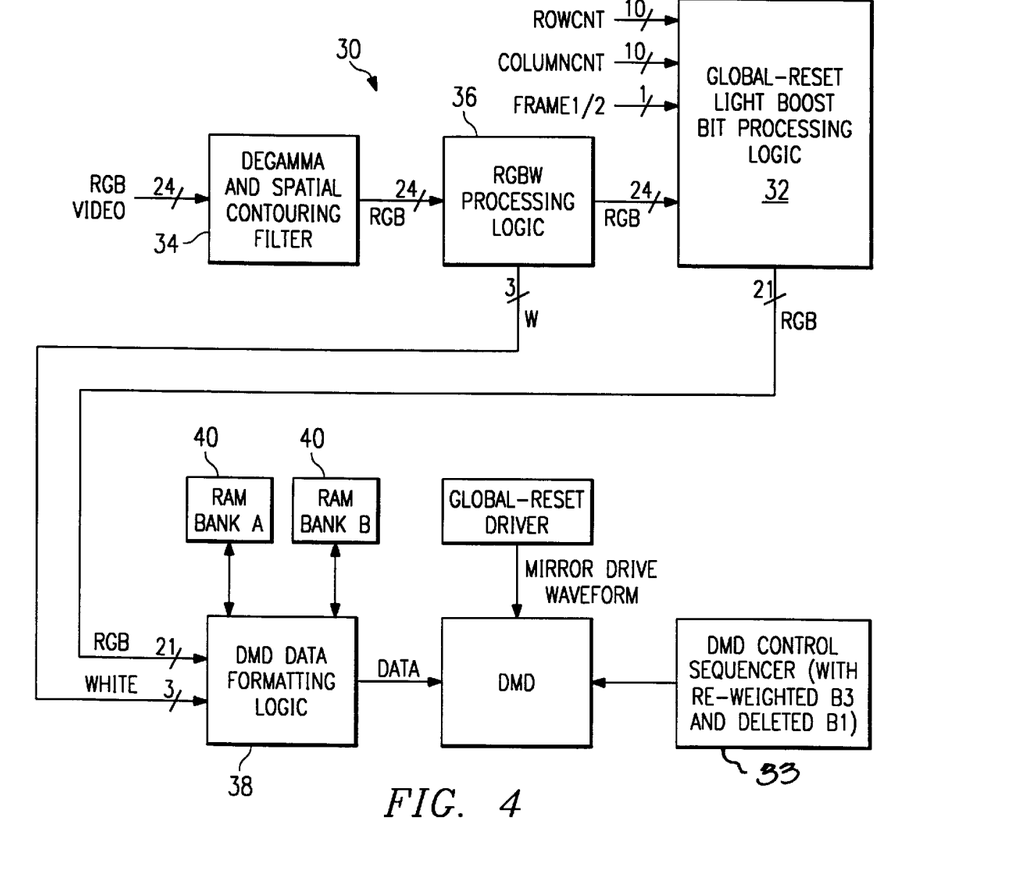
FIG. 4 is a block diagram of the present invention including a global-reset light boost bit processing logic which converts the standard bits into a combination of binary and ternary bits, the value of the bits for each pixel being a function of the spatial location of the pixel and whether an even frame or an odd frame of video data is being displayed.

Referring now to FIG. 4, there is shown at 30 a block diagram of the preferred embodiment of the present invention. System 30 is conventional, with the exception of the additional global-reset light boost bit processing logic 32 converting the typical 8-bit binary data into 7 bits, some bits being binary and some being ternary, that is, having tri-state values due to the temporal-spatial multiplexing according to the present invention. The PWM Control Sequencer 33 reweights display on-times of ternary bits. Logic 32 is seen to output the 7 bits of pixel data for each of the 3 colors, namely, red, green and blue for a total of 21 bits for each frame of video data to be displayed. Logic 32 outputs these bits as a function of input signals that spatially identify the pixels on the DMD, namely, the row count signal ROWCNT which indicates which row a particular pixel is in, the column count signal COLUMNCNT which identifies which column the particular pixel is in, and a FRAME 1/2 signal which alternates between a logic 0 and a logic 1. Signal FRAME 1/2 indicates whether frame one or frame two is associated with the particular data being formatted into the bit-planes. Referring back to FIG. 2, for instance, for pixel 20, identified as being in column 1, row 1, whether frame one and frame two is identified with the data. If, for instance, a pixel value of 1 is to be displayed on pixel 20, logic 32 will load a 2 value into bit B1 for frame one, as identified by a logic low on the signal line FRAME 1/2, but will load a value of 0 for bit B1 for frame two, identified as a logic high on FRAME 1/2. The signal provided on signal line FRAME 1/2 thus alternates between a logic 0 and a logic 1 in synchronism with the frames of RGB video input into system 30.

As another example, if a digital value of 3 is to be displayed on a pixel identified at 22 in FIG. 2, a value of 0 will be applied to bit B2 for frame one, with a value of 6 being applied to bit B2 during frame two. Thus again logic 32 determines for a particular pixel what values are loaded into the DMD for each of frame one and frame two, continuously as video data is displayed, as a function of where a particular pixel spatially is by row, column, and temporally by frame.

Also seen in FIG. 4 is that 24-bit RGB data is input into system 30 from the video source, and the degamma filter 34 gives a 24-bit output which is necessary for emulating CRT response on a DMD. Filter 34 includes a spatial contouring filter to reduce any low-level graycode 8-bit quantization artifacts. The RGBW processing logic 36 utilizes the 3 unused bits to insert the W data and perform any necessary processing, such as hue correction, on the 24-bit RGB data. The resulting 3-bit W output is an output to the DMD formatting function.

The 24-bits from the RGBW processing logic 36 are input to the global-reset light boost logic 32. The global-reset light boost logic block 32 only performs the spatial-temporal multiplexing on bits B1 and B2 and eliminates bit B0 entirely for the embodiment of Table 2A and FIG. 2, and performs the spatial-temporal multiplexing on bits B2 and B3, eliminating bit-plane B1 for the embodiment of Table 2B and shown in FIG. 3. The resulting 21-bit output is an input to the DMD data formatting logic 38.

The formatting logic 38 puts the data into bit-plane format, and stores it in the double-buffered frame memory 40. At each frame boundary, the memories are swapped. Thus, one bank of memory is read and the other loaded continuously during each frame. The light boost is accomplished by the global-reset light boost logic 32 which implements the schemes shown in FIG. 2 and in FIG. 3. Only 21 bit-planes are required, 7 for each color, to display RGB data using the present invention. Thus, 3 bit-planes are used for RGBW.

Figure 5:
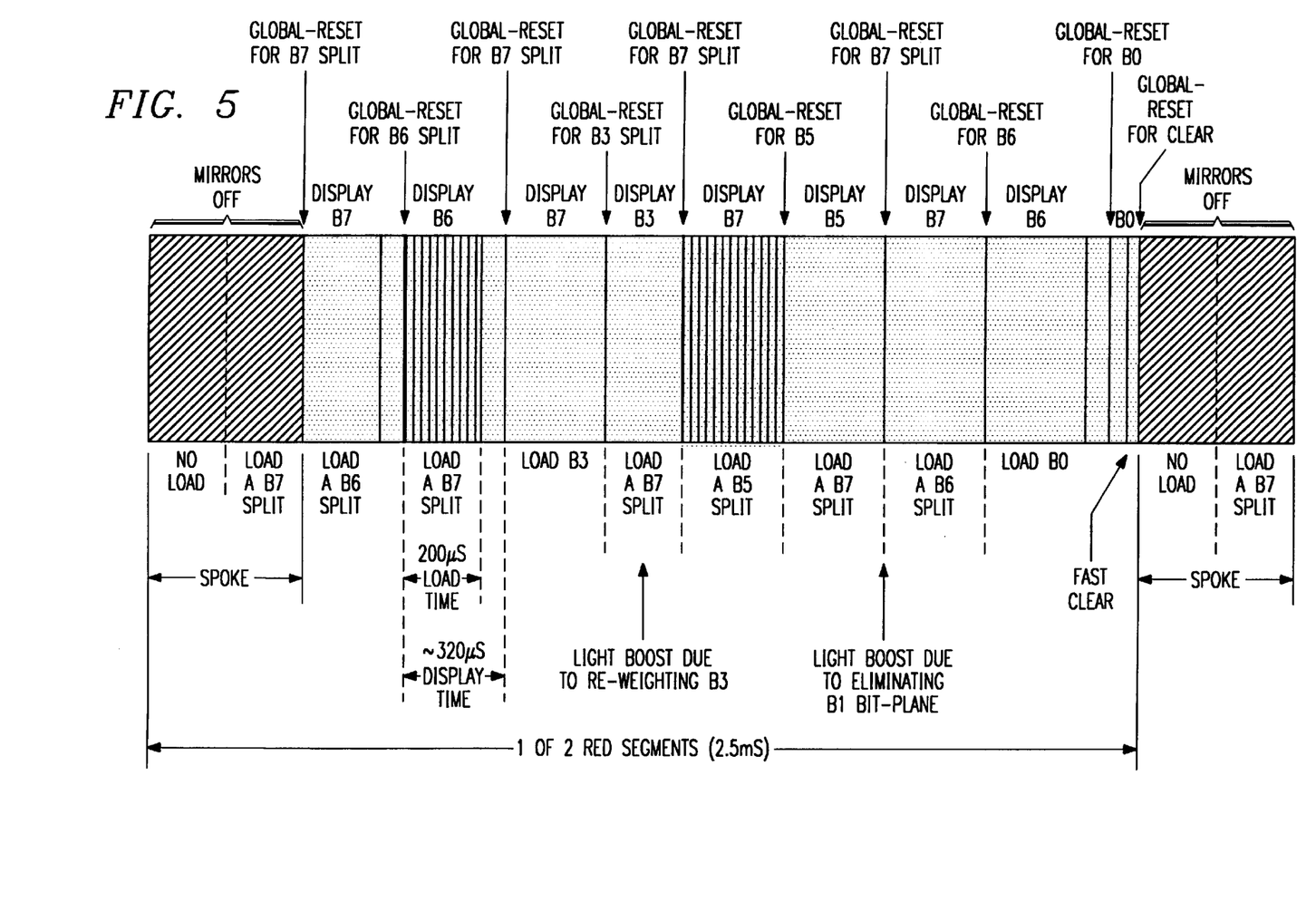
FIG. 5 is a graphic illustration of loading and displaying bit-planes into the DMD according to one preferred embodiment of the present invention which eliminates the two 200 us deadtimes to achieve global light boost of the displayed image.

Referring now to FIG. 5, in view of FIG. 1, there is illustrated the light boost achieved using the embodiment of Table 2B and FIG. 3, whereby the two deadtimes are eliminated by eliminating bit-plane B1 and re-weighting bit-plane B3 to an increased weight. As shown, there is ample time to load bit-plane data while displaying each bit-plane. The short bit-plane B0 is displayed just before a spoke to take advantage of the spoke deadtime. The other short bit-plane B2 (not shown) is displayed just before the other spoke identified with the other red segment (2 red segments on the 6 segment wheel) to take advantage of that deadtime. Bit-plane B3 is now long enough to avoid generating a deadtime. FIG. 5 illustrates the light boost of 10%.

While the present invention has been shown to be used to get 8-bits of grayscale resolution using 7 bit-planes, the present invention may be applied to higher or lower order bits to get a light boost. The usage of bit-plane B1 and B2 as described in reference to Table 2A in FIG. 2, or to the usage bit-planes B2 and B3 as used in reference to Table 2B in FIG. 3, is not the only possibility of performing global-reset light boost, and other temporal-spatial multiplexing is broadly intended to be covered by the present invention. More or less than 8-bits per color can be used, with this invention still being implemented and a light boost achieved.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

We claim:

1. A method of displaying digital video data using pulse width modulation, comprising the steps of:

providing said digital video data having a first plurality of data bits and representing a video frame;

apportioning bit times corresponding to the value of each of said data bits within said video frame time using pulse width modulation;

converting said digital video data into a second plurality of time-weighted bits, said second plurality of bits being other than purely binary weighted and less in number than said first plurality of data bits; and utilizing the converted bits to form a first frame of video data.

2. The method as specified in claim 1 further comprising the step of performing spatial-temporal multiplexing on a first bit and a second said bit to form gray scales as a function of a value of said digital video data to be displayed.

3. The method as specified in claim 1 comprising the step of performing said spatial-temporal multiplexing on a first bit and a second said bit by alternately loading said first bit and said second bit every two said displayed frames of video data.

4. The method as specified in claim 3 comprising the step of using n−1 said bits for each color displayed to achieve $2^n$ gray shades of each said color displayed.

5. The method as specified in claim 1 comprising the step of using ternary said bits to display said frame of video data.

6. The method as specified in claim 4 further comprising the step of inserting a bit of white data for each color displayed.

7. A system displaying digital video data using pulse width modulation, comprising:
  means for receiving digital video data having a first plurality of data bits and representing a video frame and apportioning bit times to said first plurality of bits within said video frame time using pulse width modulation;
  a logic circuit converting said digital video data into a second plurality of time-weighted bits, said second plurality of bits being other than purely binary weighted and less in number than said first plurality of data bits; and
  a spatial light modulator providing a display corresponding to said second plurality of bits to form a first frame of video.

8. The system as specified in claim 7 wherein said logic circuit performs spatial-temporal multiplexing on a first bit and a second said bit to form gray scales as a function of a value of said digital video data to be displayed.

9. The system as specified in claim 7 wherein said logic circuit performs said spatial-temporal multiplexing on a first bit and a second said bit by alternately loading said first bit and said second bit every two said displayed frames of video data.

10. The system as specified in claim 9 wherein said logic circuit provides n−1 said bits for each color displayed to achieve $2^n$ gray shades for each said color displayed.

11. The system as specified in claim 7 wherein said logic circuit provides ternary said bits to display said frame of video data.

12. The system as specified in claim 10 wherein said logic circuit provides a bit of white data for each said color displayed.

13. A method of reducing the number of bit-planes required in a system for displaying digital video data using pulse width modulation, comprising the steps of:
  providing a plurality of bit planes, said plurality of bit planes representing a frame of data, each of said bit planes representing a different binary value, the totality of said bit planes representing gray scale values for said frame; and
  eliminating one of said bit planes by replacing a pair of said bit planes with a single bit plane by averaging the binary values of two of said bit planes on a pixel by pixel basis.

14. The method of claim 13 wherein said averaging takes place at pixels separated by at least one pixel from all other pixels where said averaging is also taking place in the same frame on a column and row basis.

15. The method of claim 13 wherein said two of said bit planes have a binary value difference of two.

16. The method of claim 14 wherein said two of said bit planes have a binary value difference of two.

17. The method of claim 13 wherein one of said pair of bit planes corresponds to the least significant bit and the other of said pair of bit planes corresponds to the next least significant bit.

18. The method of claim 14 wherein one of said pair of bit planes corresponds to the least significant bit and the other of said pair of bit planes corresponds to the next least significant bit.

19. The method of claim 15 wherein one of said pair of bit planes corresponds to the least significant bit and the other of said pair of bit planes corresponds to the next least significant bit.

20. The method of claim 16 wherein one of said pair of bit planes corresponds to the least significant bit and the other of said pair of bit planes corresponds to the next least significant bit.

* * * * *